US010481686B2

(12) United States Patent
Komatsu et al.

(10) Patent No.: US 10,481,686 B2
(45) Date of Patent: Nov. 19, 2019

(54) IMAGE DISPLAY DEVICE FOR CHANGING FOCAL POINT AND CONVERGENCE OF DISPLAY IMAGE

(71) Applicant: SEIKO EPSON CORPORATION, Tokyo (JP)

(72) Inventors: Akira Komatsu, Tatsuno-machi (JP); Takashi Takeda, Suwa (JP); Toshiaki Miyao, Matsumoto (JP); Masayuki Takagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/924,900

(22) Filed: Mar. 19, 2018

(65) Prior Publication Data

US 2018/0288359 A1    Oct. 4, 2018

(30) Foreign Application Priority Data

Mar. 29, 2017    (JP) .................................. 2017-064542

(51) Int. Cl.
*G06F 3/01*      (2006.01)
*H04N 5/74*      (2006.01)
(Continued)

(52) U.S. Cl.
CPC ......... *G06F 3/013* (2013.01); *G02B 27/0172* (2013.01); *G02B 27/0955* (2013.01);
(Continued)

(58) Field of Classification Search
CPC ...... H04N 5/74; H04N 13/344; H04N 13/332; G02B 27/0172; G02B 27/0955;
(Continued)

(56) References Cited

U.S. PATENT DOCUMENTS

2004/0109135 A1*  6/2004  Watanabe ............ A61B 3/1225
                                             351/205
2016/0150950 A1*  6/2016  Yu ........................ A61B 3/0025
                                             351/206
(Continued)

FOREIGN PATENT DOCUMENTS

JP    H07-049464 A    2/1995
JP    H09-218376 A    8/1997
(Continued)

*Primary Examiner* — Premal R Patel
(74) *Attorney, Agent, or Firm* — Oliff PLC

(57) ABSTRACT

An image display device includes: an image display section that displays an image for a user and allows the user to visually recognize external light; a line-of-sight direction and distance detecting section that detects a line-of-sight direction of the user and a distance to an object located in the line-of-sight direction; and a display control section that controls display operation of the image display section. The image display section includes a focal point and convergence changing section that changes a convergence and a focal point of a display image to be projected. The display control section controls the focal point and convergence changing section based on the line-of-sight direction and the distance to the object detected by the line-of-sight direction and distance detecting section.

8 Claims, 7 Drawing Sheets

(51) Int. Cl.
  *G02B 27/01* (2006.01)
  *G02B 27/09* (2006.01)
  *H04N 13/344* (2018.01)
  *H04N 13/332* (2018.01)
  *G02B 13/14* (2006.01)

(52) U.S. Cl.
  CPC ............. *H04N 5/74* (2013.01); *H04N 13/344* (2018.05); *G02B 13/14* (2013.01); *G02B 2027/0138* (2013.01); *G02B 2027/0159* (2013.01); *G02B 2027/0185* (2013.01); *H04N 13/332* (2018.05)

(58) Field of Classification Search
  CPC .... G02B 2027/0138; G02B 2027/0185; G02B 2027/0159; G02B 13/14; G06F 3/013
  See application file for complete search history.

(56) References Cited

U.S. PATENT DOCUMENTS

| | | | |
|---|---|---|---|
| 2016/0246384 A1* | 8/2016 | Mullins | G06F 3/017 |
| 2017/0076505 A1* | 3/2017 | Gavriliuc | G06T 19/006 |
| 2017/0140223 A1* | 5/2017 | Wilson | G02B 27/0093 |
| 2017/0374341 A1* | 12/2017 | Michail | G06T 3/60 |
| 2018/0031848 A1* | 2/2018 | Huang | G02B 27/017 |
| 2018/0136486 A1* | 5/2018 | Macnamara | A61B 3/00 |
| 2019/0033058 A1* | 1/2019 | Tsurumi | G01B 11/02 |

FOREIGN PATENT DOCUMENTS

| | | |
|---|---|---|
| JP | H11-202256 A | 7/1999 |
| JP | 2010-139589 A | 6/2010 |

* cited by examiner

IMAGE DISPLAY DEVICE FOR CHANGING FOCAL POINT AND CONVERGENCE OF DISPLAY IMAGE

BACKGROUND

1. Technical Field

The present invention relates to an image display device that presents a video as a virtual image to a viewer.

2. Related Art

As an image display device such as a head-mounted display (hereinafter also referred to as "HMD") worn on the head of a viewer, a so-called see-through type image display device that allows the viewer to visually recognize video light and external light superimposed on each other has been known.

In the see-through type image display device allowing a user to directly view an outside world image, an additional image may be displayed for an object located in the line-of-sight direction of the user. In displaying the additional image for the object as described above, a distance to the object in the line-of-sight direction of the user is calculated or detected, an image whose convergence is changed by moving an image or optical element in a display element based on the obtained distance is displayed, and thereby the additional image is displayed at the same position as the object when the user sees the image with both eyes (JP-A-11-202256 and JP-A-2010-139589).

In the device in which only the convergence is adjusted as described above, a phenomenon that does not occur in the real world occurs in which a focal point adjustment distance and a convergence distance are different with respect to a display image. In this case, although the focal point adjustment distance and the convergence distance coincide with each other in a real image, the focal point adjustment distance and the convergence distance do not coincide with each other in the display image; therefore, a feeling of strangeness or eye fatigue is likely to occur in the user.

SUMMARY

An advantage of some aspects of the invention is to provide an image display device that suppresses the occurrence of a feeling of strangeness or fatigue when an additional image is displayed for an object located in the line-of-sight direction of a user.

An image display device according to an aspect of the invention includes: an image display section that displays an image for a user and allows the user to visually recognize external light; a line-of-sight direction and distance detecting section that detects a line-of-sight direction of the user and a distance to an object located in the line-of-sight direction; and a display control section that controls display operation of the image display section, wherein the image display section includes a focal point and convergence changing section that changes a convergence and a focal point of a display image to be projected, and the display control section controls the focal point and convergence changing section based on the line-of-sight direction and the distance to the object detected by the line-of-sight direction and distance detecting section.

In the image display device, the display control section controls the focal point and convergence changing section based on the line-of-sight direction and the distance to the object detected by the line-of-sight direction and distance detecting section; therefore, an image at substantially the same convergence and in substantially the same focus state as those of the object in the outside world visually recognized by a viewer can be displayed for the object, and thus a feeling of strangeness or fatigue can be reduced.

In a specific aspect of the invention, the display control section causes the focal point and convergence changing section to adjust the convergence and the focal point of the display image based on an angle of convergence obtained from the line-of-sight direction and the distance to the object detected by the line-of-sight direction and distance detecting section. The operation of the focal point and convergence changing section is controlled based on the angle of convergence, so that control is relatively simplified. When the angle of convergence of the display image coincides with that of the object, somewhat deviation of a focal point is allowed and thus the viewer has less feeling of strangeness.

In another aspect of the invention, the focal point and convergence changing section includes an optical member that changes the convergence and the focal point, in conjunction with each other, of the display image to be projected, in a predetermined relationship. In this case, an increase in the size of the focal point and convergence changing section can be easily avoided.

In still another aspect of the invention, the optical member is asymmetrically disposed with respect to a projection optical axis of a projection optical system for displaying an image for the user, is driven so as to change the power of the optical member, and changes the convergence and the focal point of the display image with the change in power. In this case, the focal point of the projection optical system changes and also the traveling direction of image light changes as the power of the optical member changes; therefore, the convergence and the focal point of the display image can be changed.

In still another aspect of the invention, the optical member includes a pair of lenses, the pair of lenses each include a concave portion and a convex portion, and the optical member adjusts the focal point and the convergence by moving at least one of the pair of lenses in a horizontal direction intersecting an optical axis.

Instill another aspect of the invention, the optical member changes its lens shape based on the amount of a liquid contained therein.

Instill another aspect of the invention, the optical member deforms a boundary between two kinds of liquids having different specific gravities with an electric field applied to the liquids.

In still another aspect of the invention, the line-of-sight direction and distance detecting section detects a distance to an object within a range of a predetermined field of view with respect to the detected line-of-sight direction. In this case, objects can be narrowed, and thus it is easy to display an image at substantially the same convergence and in substantially the same focus state as those of the object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an image display device of a first embodiment of the invention will be described in detail with reference to the drawings.

Figure 1:
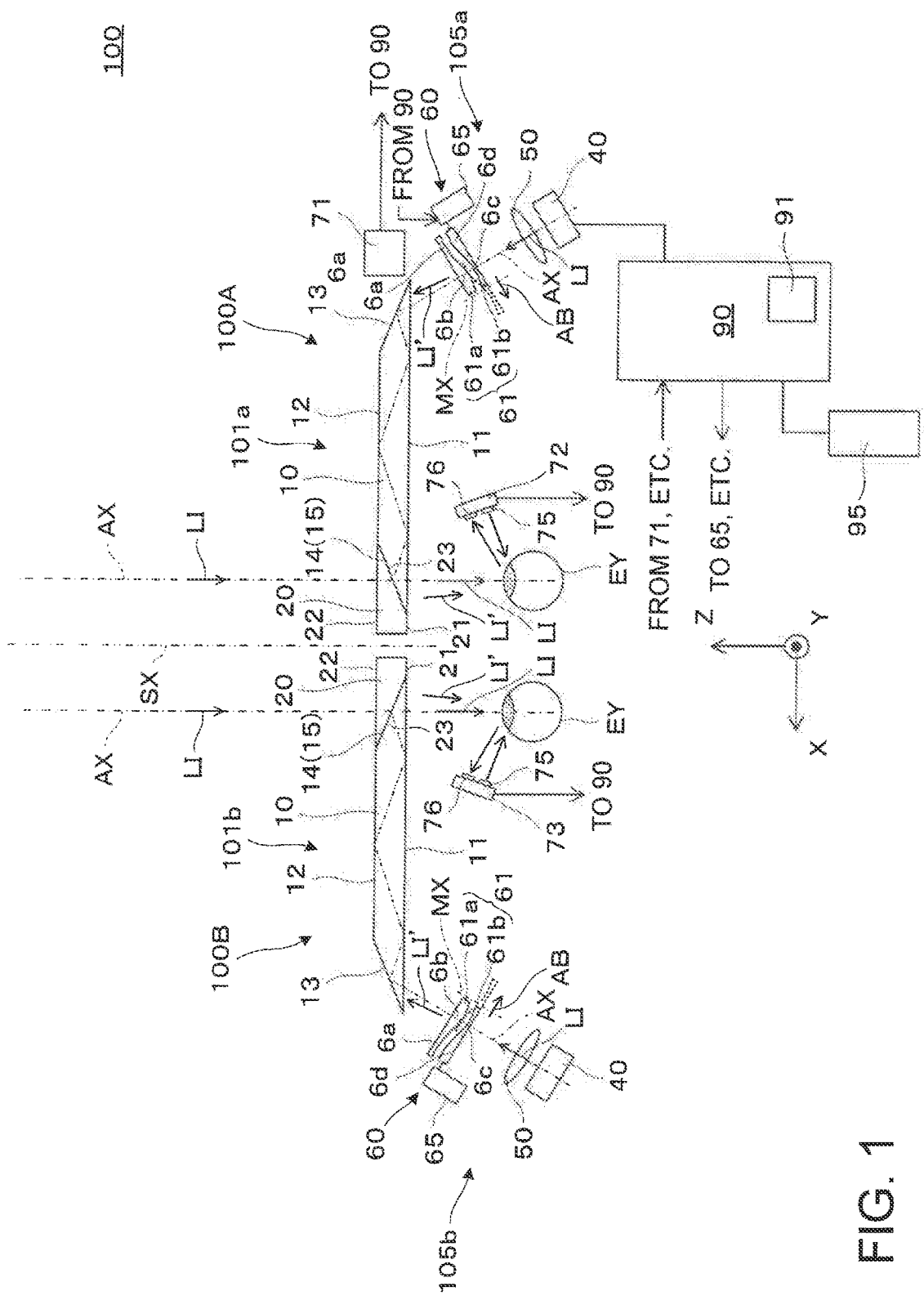
FIG. 1 is a plan view for explaining an image display device of a first embodiment.

As shown in FIG. 1, the image display device 100 of the embodiment is a head-mounted display (HMD) that can implement AR display. The image display device 100 can display an image as a virtual image by image light or video light for a viewer or user who wears the image display device 100, or allow the viewer or user to visually recognize the image, and at the same time, can allow the viewer to visually recognize or view an outside world image by external light in a see-through manner. The image display device 100 includes a first image display section 100A, a second image display section 100B, a distance measuring section 71, line-of-sight detecting sections 72 and 73, and a main control section 90. Here, the distance measuring section 71 and the line-of-sight detecting sections 72 and 73 function as a line-of-sight direction and distance detecting section that detects a line-of-sight direction of the user and a distance to an object located in the line-of-sight direction. In FIG. 1, the left-right direction, which corresponds to an eye width along the paper surface and is orthogonal to an axis of symmetry SX, is parallel to the X-axis of the three axes orthogonal to each other, and an optical axis AX that is set so as to extend in front of each eye EY of the viewer, or the axis of symmetry SX, is parallel to the Z-axis of the three axes orthogonal to each other. The direction in which the Y-axis of the three axes orthogonal to each other extends is referred to as "up-down direction", which is vertical to the paper surface.

The first image display section 100A and the second image display section 100B are portions that respectively form virtual images for the right eye and the left eye, and respectively include first and second image display combining sections 101a and 101b that cover the front of the eyes of the viewer while allowing the viewer to see therethrough, and first and second image forming sections 105a and 105b. The image display sections 100A and 100B have similar optical functions and configurations that are reversed from each other. In the following, therefore, only the first image display section 100A will be described, and the second image display section 100B will not be described.

The first image forming section 105a of the first image display section 100A includes an image forming device 40 that forms video light LI, a projection lens 50 to emit the video light (image light) LI to the first image display combining section 101a in order to project a projection image formed by the image forming device 40, and a focal point and convergence changing section 60 for adjusting a focal point and a convergence of a virtual image or display image.

The image forming device 40 includes, for example, an organic EL panel or other self-emitting video element. The image forming device 40 can form a projection image by itself. The image forming device 40 can be configured to include a video element that is, for example, an LCD panel or other spatial light modulator, and an illumination device that is a backlight to emit illumination light to the video element.

The projection lens 50 is a projection optical system including one or more lenses, and is accommodated and supported in an exterior member (not shown) together with the image forming device 40 and the like. In the illustrated example, the projection lens 50 functions as a collimator that forms a virtual image at substantially infinity along the optical axis AX, which is a projection optical axis.

The focal point and convergence changing section 60 operates under the control of the main control section 90. The focal point and convergence changing section 60 is disposed on the optical path at the rear of the projection lens 50 in order to change the convergence and the focal point of the display image to be projected as a virtual image. The focal point and convergence changing section 60 includes an optical member 61 and a drive section 65. The optical member 61 is used to change the convergence and the focal point, in conjunction with each other, of the display image to be projected, in a predetermined relationship, and includes a first lens 61a and a second lens 61b as a pair of lenses. The optical member 61 or the lenses 61a and 61b constituting the optical member 61 are disposed asymmetrically with respect to the optical axis AX extending from the projection lens 50. The former first lens 61a includes a concave portion 6a and a convex portion 6b. The latter second lens 61b includes a concave portion 6c and a convex portion 6d. In the first lens 61a, the concave portion 6a and the convex portion 6b are smoothly connected together. In the second lens 61b, the concave portion 6c and the convex portion 6d are smoothly connected together. The first lens 61a is fixed with respect to the optical axis AX, while the second lens 61b is movable by driving of the drive section 65 in the horizontal direction of an optical system, which is a direction vertical to the optical axis AX and is parallel to a horizontal reference plane parallel to the XZ plane. That is, an axis MX of the second lens 61b can be gradually changed by the drive section 65 from the state where the axis MX overlaps the optical axis AX to the state where the axis MX is parallel to the optical axis AX and distant therefrom by a predetermined distance in the horizontal direction. With this change, the first lens 61a and the second lens 61b can be changed from a fitted state to a decentered state, and are driven so as to change the power in the entire optical member 61, so that it is possible, as will be described in detail later, to change the convergence and the focal point of the display image to be projected as a virtual image, while coordinating the convergence with the focal point, with the change in power. In the above, the convergence and the focal point are changed by moving only the second lens 61b in the horizontal direction vertical to the optical axis AX; however, the convergence and the focal point can be changed by moving both the first and second lenses 61a and 61b in the horizontal direction vertical to the optical axis AX.

The first image display combining section 101a is a plate-like or prism-like member as a whole, and includes a light guide member 10 for light guide and see-through, and a light transmitting member 20 for see-through. The light guide member 10 is a prism-like or block-like member having a light transmitting property. The light transmitting member 20 is an auxiliary optical block or light transmitting section that supplements a see-through function of the light guide member 10, and is bonded to the light guide member 10 and fixed integrally therewith.

The light guide member 10 includes first to fourth surfaces 11 to 14 as side surfaces having an optical function. The first surface 11 and the second surface 12 extend in parallel with each other, and enable light guiding within a flat plate-like light guide body. The third surface 13 on the incident side is a plane, and reflects the video light LI that is incident from the first image forming section 105a on the light guide member 10 through the first surface 11 to be coupled in the light guide member 10. The fourth surface 14 on the exiting side is a plane, and a half-mirror layer 15 is provided on the fourth surface 14. The half-mirror layer 15 is a reflecting film having a light transmitting property, that is, a semi-transmitting reflecting film. The half-mirror layer 15 is formed by depositing a metal reflecting film or a dielectric multilayer film, and its reflectance for the video light LI is appropriately set.

The light transmitting member 20 includes a first transmission surface 21, a second transmission surface 22, and a third transmission surface 23 as side surfaces having an optical function. The first transmission surface 21 lies on an extended plane of the first surface 11 of the light guide member 10. The second transmission surface 22 lies on an extended plane of the second surface 12 of the light guide member 10. The third transmission surface 23 is bonded to and integrated with the fourth surface 14 of the light guide member 10.

Hereinafter, the optical path of the video light LI will be described. First, the video light LI that is formed by the image forming device 40 is incident on one end of the light guide member 10 of the first image display combining section 101a through the projection lens 50 and the focal point and convergence changing section 60. The video light LI incident on the one end of the light guide member 10 propagates in the light guide member 10, while being reflected by the first surface 11 and the second surface 12, to reach the other end. The video light LI that has reached the other end of the light guide member 10 is partially reflected by the half-mirror layer 15, incident again on the first surface 11, and passes through the first surface 11. The video light LI that has passed through the first surface 11 is incident on the eye EY of the viewer or at a position equivalent to that. That is, the viewer views a display image as a virtual image by the video light LI.

In the first image display combining section 101a, the first surface 11 and the second surface 12 are parallel to each other, the first transmission surface 21 and the second transmission surface 22 are parallel to each other, and the first surface 11 and the first transmission surface 21 are parallel to each other. Therefore, visibility is substantially 0 with respect to external light, thereby not causing an aberration or the like. With the above configuration, the viewer views an outside world image without distortion, that is, the viewer can visually recognize or view the outside world substantially as it is in a see-through manner. On this occasion, it is possible to allow the viewer to view the outside world image that is seen through the half-mirror layer 15, such that a virtual image formed by the image forming device 40 is superimposed on the outside world image.

Figure 2:
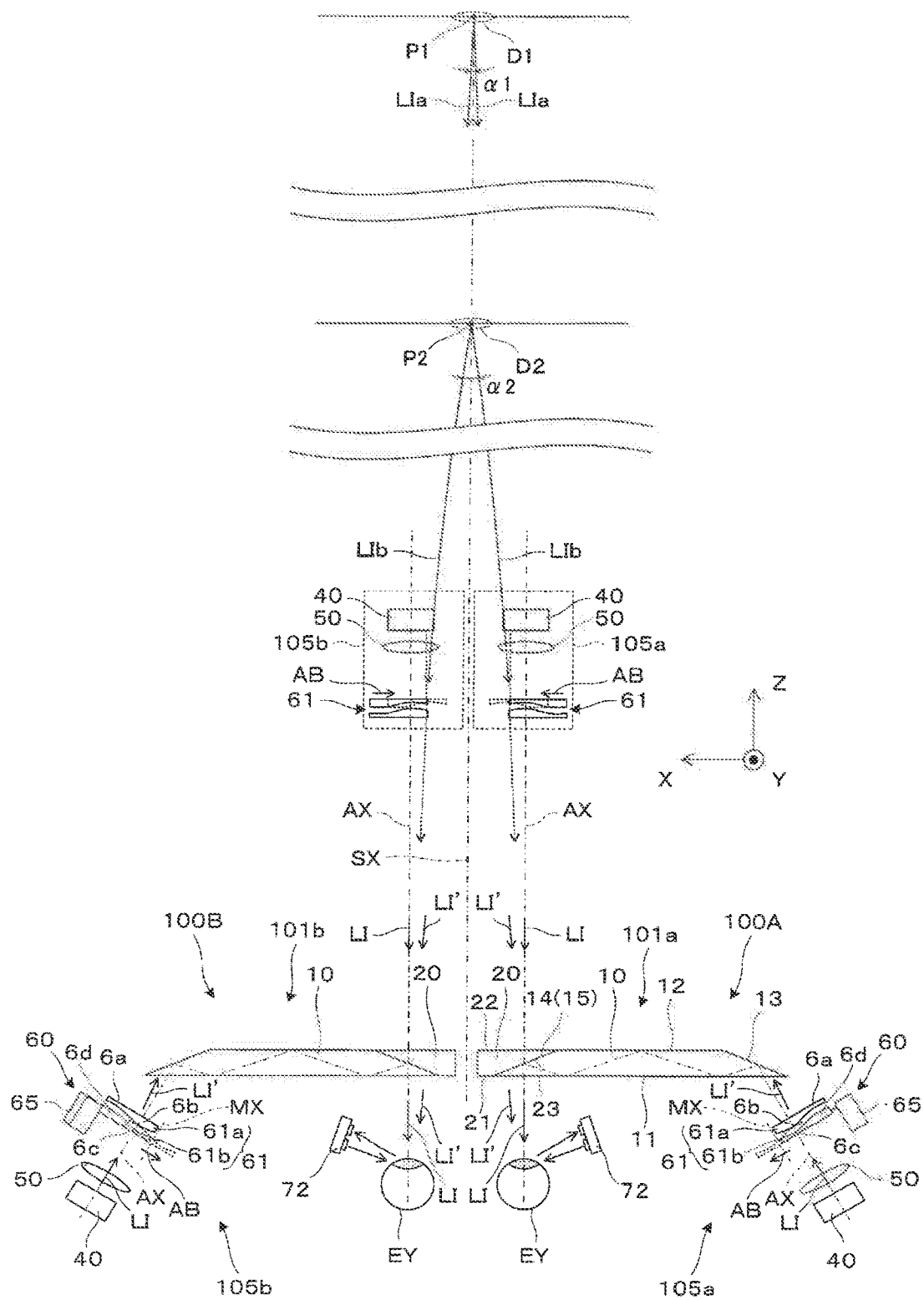
FIG. 2 is a plan view for explaining the display of a virtual image by the image display device in FIG. 1.

Here, with reference to FIG. 2, a method of naturally changing, by the focal point and convergence changing section 60, the convergence and the focal point, in conjunction with each other, of the display image to be projected as a virtual image will be described. FIG. 2 is a conceptual view showing together the state where optical paths are not bent by the first and second image display combining sections 101a and 101b, in which virtual or equivalent first and second image forming sections 105a and 105b are disposed in front of the lines of sight.

At first, it is assumed in the focal point and convergence changing section 60 that the combined power of the lenses 61a and 61b is substantially zero with the convex portion 6b and the concave portion 6c facing each other. In this case, a display image D1 as a virtual image is projected at infinity or a distant place. That is, the video light LI from the first and second image forming sections 105a and 105b is incident on both eyes EY of the viewer at an angle of convergence $\alpha 1$ that is close to zero, like video light LIa from the display image D1 located at substantially infinity. On this occasion, LIa incident on both eyes EY is in the state of being substantially equivalent to light from P1, which is an intersection point of the left and right lines of sight, and the surroundings of P1, and is in the state of being close to substantially parallel light. In the illustrated example, the intersection point P1 corresponding to the lines of sight of the viewer is assumed to be located in front of the axis of symmetry SX between the image forming sections 105a and 105b.

Thereafter, when the axis MX of the second lens 61b is gradually shifted in the AB-direction by the drive section 65, the boundary between the concave portion 6c and the convex portion 6d or a portion that is closer to the convex portion 6d faces the convex portion 6b to bring the combined power of the lenses 61a and 61b to a positive value and also change the original video light LI to video light LI' that is deflected outward on the paper surface, that is, to the corner sides of both eyes EY. As a result of this, a display image D2 as a virtual image is projected at a relatively close position. That is, the video light LI' from the first and second image forming sections 105a and 105b is incident on both eyes EY of the viewer at an angle of convergence $\alpha 2$ that is relatively large, like video light LIb from the display image D2 located at a relatively close position. On this occasion, LIb incident on both eyes EY is in the state of being substantially equivalent to light from P2, which is an intersection point of the left and right lines of sight, and the surroundings of P2, and is divergent light. That is, the viewer views a virtual image projected in front, such that the virtual image is shifted leftward for the right eye EY and shifted rightward for the left eye EY, and that the focus position or focal point is moved closer to the eyes EY or the image forming device 40.

Figure 3:
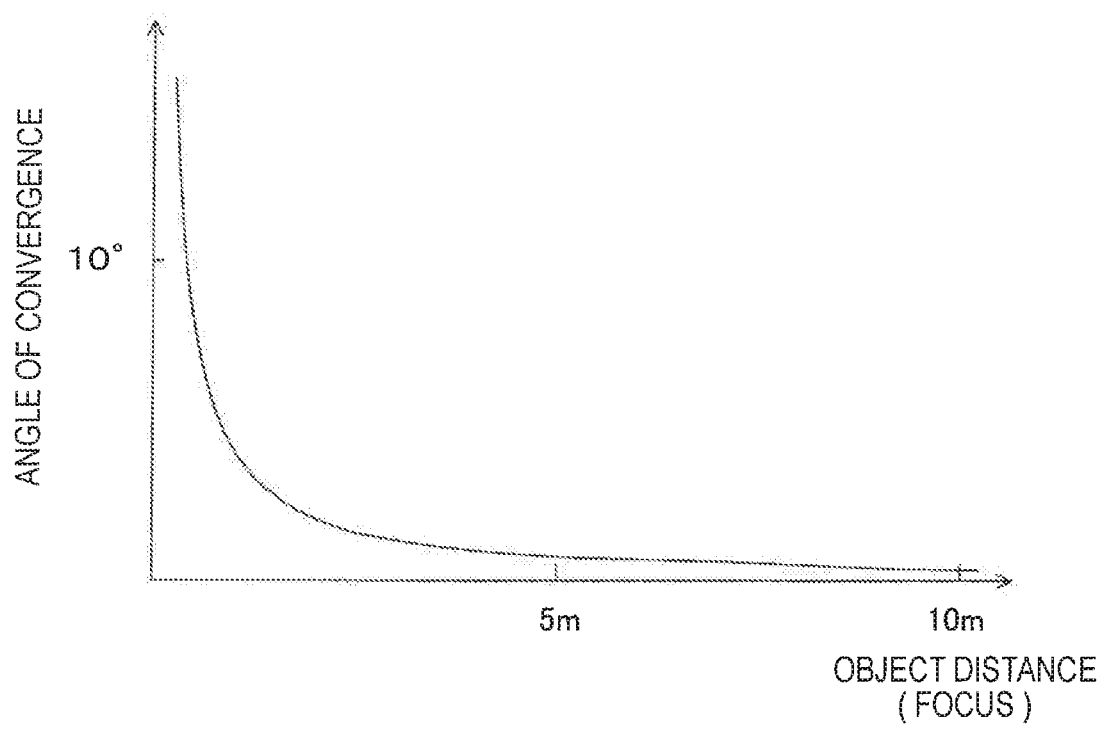
FIG. 3 is a diagram for explaining the relationship between a distance and an angle of convergence in a front direction.

FIG. 3 illustrates the relationship between an object distance to an object located ahead in the line of sight and an angle of convergence when gazing at the object. As shown by the solid line, there is a functional correspondence relationship in which the angle of convergence decreases with increasing object distance. When the viewer views an image that satisfies the correspondence relationship or is in the state of being close to the correspondence relationship, the viewer is less likely to sense a feeling of strangeness and also eye fatigue can be reduced. The focal point and convergence changing section 60 coordinately adjusts the angles of convergence $\alpha 1$ and $\alpha 2$ of the display images D1 and D2 and the focus position or the focal point in a conjunction relationship that satisfies the correspondence relationship shown by the solid line in FIG. 3 or a correspondence relationship approximate to that.

Figure 4:
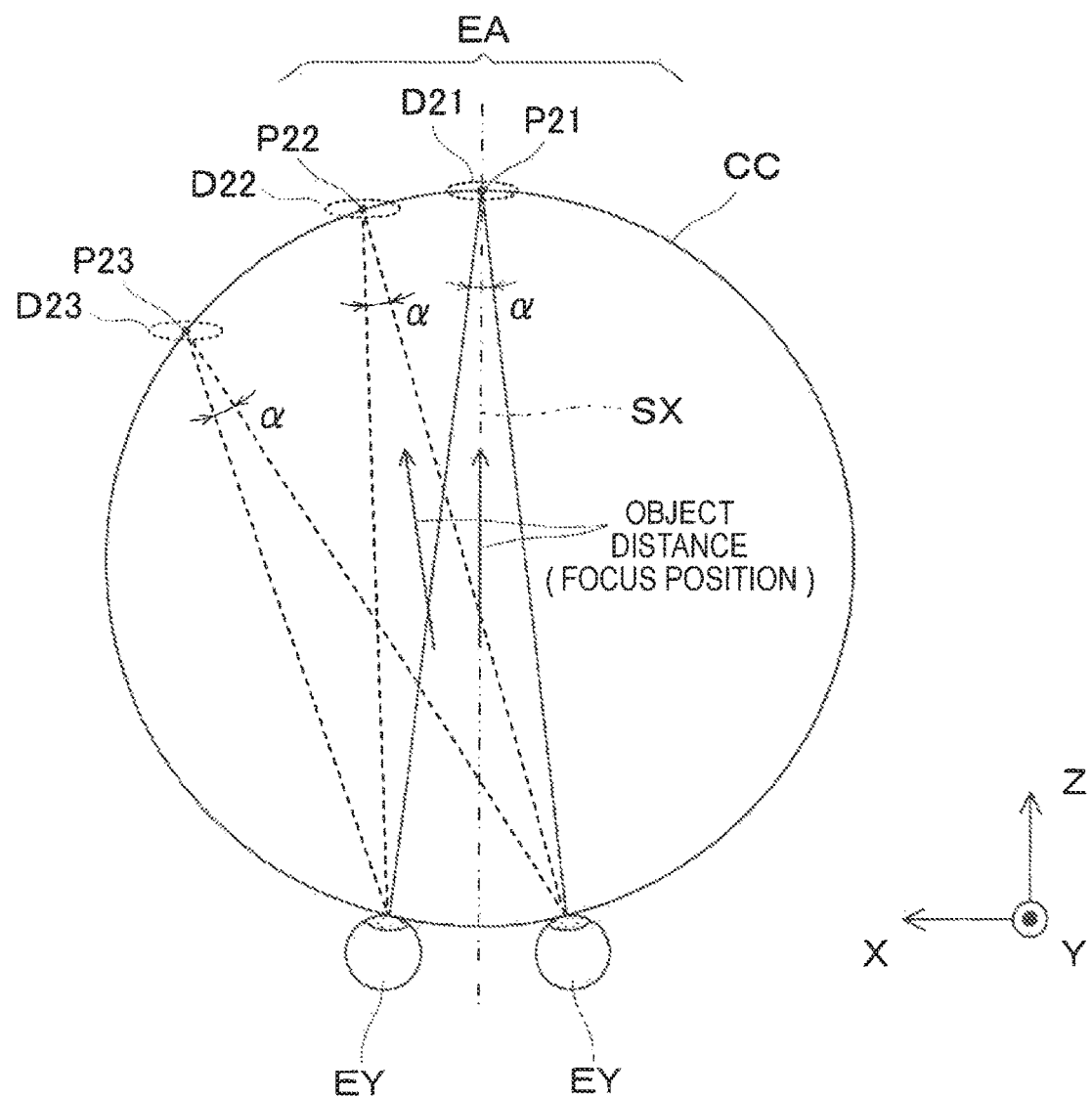
FIG. 4 is a diagram for explaining the relationship between a distance and an angle of convergence in an oblique direction.

FIG. 4 shows the case where the direction of the line of sight is deviated from the front, which is forward in the axis of symmetry SX, to the left in the horizontal direction for example. Even when the line of sight or the point of view moves from an intersection point P21 to an intersection point P22, if the intersection point P22 is located on a circumcircle CC of a triangle with the two eyes EY and the original intersection point P21 being as vertices, an angle of convergence α is maintained from the inscribed angle theorem. In the case of a position (i.e., the intersection point P22) that is relatively close to the axis of symmetry SX, if the angle of convergence α is maintained, the object distance is also substantially maintained. That is, by using the conjunction relationship between the angle of convergence and the focus position on the axis of symmetry SX as shown in FIG. 3, the viewer can view a display image D22 projected at a position close to the axis of symmetry SX without a feeling of strangeness, like a display image D21 projected on the axis of symmetry SX. Further, even when a display image D23 is projected at a position (i.e., an intersection point P23) distant from the axis of symmetry SX, if the angle of convergence α is matched, the viewer can view the display image D23 regardless of some differences in focus position, and also eye fatigue can be reduced. From the above, the angle of convergence is determined based on the direction of the line of sight detected by the line-of-sight detecting section 72 and the object distance determined from the direction of the line of sight by the distance measuring section 71, and the focal point and convergence changing section 60 is operated so as to satisfy the conjunction relationship as shown in FIG. 3 based on the angle of convergence obtained in this manner, so that the angle of convergence and the focus position or the focal point can be approximately matched for a gaze object and thus that the viewer can view the display images D21 to D23 without a feeling of strangeness. Specifically, an appropriate optical design is made such that the angle of convergence and the object distance (i.e., the focus position) can be collectively adjusted substantially along the characteristic curve or the predetermined relationship as shown in FIG. 3 by moving the second lens 61b with the drive section 65 in the focal point and convergence changing section and that a proper conjunction relationship can be approximately achieved for the angle of convergence and the object distance (i.e., the focus position).

When the direction of the line of sight is deviated from the front, which is forward in the axis of symmetry SX, to the up-down or vertical direction corresponding to the ±Y-direction, the correspondence relationship or correlation between the focus position and the angle of convergence is similar to that in the case of the front, and thus the focal point and convergence changing section 60 can be operated by using the conjunction relationship shown in FIG. 3 as it is. When the direction of the line of sight is an oblique direction such as an upper right direction (closer to −X and +Y) or a lower right direction (closer to −X and −Y), an approximation can be made by the conjunction relationship between the focus position or the focal point and the angle of convergence as shown in FIG. 3 as described with reference to FIG. 4.

Returning to FIG. 1, as a portion of the line-of-sight direction and distance detecting section, the distance measuring section 71 can measure a distance to each part of an outside world image viewed by the viewer. The distance measuring section 71 can be a mechanism using various distance measuring principles, and it is possible to use one that uses parallax such as, for example, a stereo camera. Moreover, it is also possible to use one that detects a phase difference or a delay time when detecting an object with an image sensor by lighting the object with infrared ray. Further, it is also possible to use a device that determines, using a camera whose focus changes in a stepwise manner, a distance to an object at the point of focus where the spatial frequency is high.

As a portion of the line-of-sight direction and distance detecting section, the line-of-sight detecting section 72 detects the orientation of the right eye EY of the viewer, that is, the line-of-sight direction of the right eye. The line-of-sight detecting section 72 includes an infrared or visible light source 75 such as, for example, an LED, and a camera 76 that captures an image of the eye EY illuminated by the light source 75. The line-of-sight detecting section 72 detects the motion of the iris or other portion based on the corner of the eye, the corneal reflex, and the like. The line-of-sight detecting section 72 may perform calibration of the line-of-sight direction on every viewer who wears the image display device 100. The line-of-sight detecting section 73 detects the orientation of the left eye EY of the viewer, that is, the line-of-sight direction of the left eye, and has a structure similar to the line-of-sight detecting section 72. The line-of-sight direction of the viewer can be known by using outputs (e.g., the average value) of both the line-of-sight detecting sections 72 and 73. When the distance measuring section 71 includes a camera, an object at which the viewer gazes can be specified from the relationship between a captured image and the direction or angle of the line of sight, and a distance to the gaze object (hereinafter also referred to as "object distance") can be measured by the distance measuring section 71. Even when the distance measuring section 71 does not include a camera, the object distance to the object at which the viewer gazes can be measured by performing distance measurement in the direction or angle of the line of sight. On this occasion, as shown in FIG. 4, it is desirable to detect the distance to the object within the range of a predetermined field of view EA centered on the intersection point P21 corresponding to the detected line-of-sight direction. Only one object distance can be selected, and therefore, the object distance can be more proper by appropriately narrowing the field of view EA. The field of view EA can be set to, for example, an effective field of view having a spread of approximately ±15°.

In the above, it is assumed that an object at which the lines of sight of the viewer intersect is specified and a distance to the object is measured. However, also as for an object present in a predetermined angular range centered on the lines of sight, it can be determined that the lines of sight meet on the object. In this case, although a plurality of objects are gaze candidates of the viewer, the gaze candidates can be narrowed down based on a criterion such as having a large area as seen from the viewer or being closest as seen from the viewer.

The predetermined field of view EA is not limited to the effective field of view. The discriminative field of view (e.g., ±2.5°), the stable gaze field of view (e.g., 60° to 90° in the horizontal direction and 45° to 70° in the vertical direction), and the like can be used as the predetermined field of view EA, and a distance to an object can be detected within the range of the discriminative field of view or the stable gaze field of view.

The main control section 90 comprehensively controls the operation of the image display device 100, and is a display control section in terms of controlling the display operation of the image display combining sections 101a and 101b. The main control section (display control section) 90 causes the line-of-sight detecting sections 72 and 73 to operate to detect the line-of-sight direction of the viewer wearing the image display device 100, and also uses the distance measuring section 71 to measure the distance to the object located ahead in the line-of-sight direction of the viewer. Information on the line-of-sight direction of the viewer and the object distance obtained by the line-of-sight direction and distance detecting section composed of the distance measuring section 71 and the line-of-sight detecting sections 72 and 73 as described above is temporarily stored in a storage section 91. On the other hand, the main control section 90 causes a pair of the image forming devices 40 provided in the first and second image forming sections 105a and 105b to perform display operation based on video data stored in the storage section 91, and thus provides a display image common to both eyes EY. On this occasion, the position of the display image in the horizontal direction or the vertical direction (i.e., the position in a plane of a virtual image) can be set on the object located ahead in the line-of-sight direction of the viewer or to the vicinity of the object by using the detection outputs of the line-of-sight detecting sections 72 and 73. Further, the position of the display image in the depth direction (i.e., the position in a direction vertical to the plane of the virtual image) can be set on the object located ahead in the line-of-sight direction of the viewer or to the vicinity of the object by using the distance measuring section 71 and the focal point and convergence changing section 60. Here, the main control section 90 can determine the distance to the object in the line-of-sight direction with the distance measuring section 71, and causes the focal point and convergence changing section 60 to operate based on the distance. The focal point and convergence changing section 60 appropriately moves the second lens 61b with the drive section 65 in a direction vertical to the optical axis AX, and thus changes the convergence and the focal point, while coordinating them, such that the position of the display image to be projected and the position of the object in the line-of-sight direction substantially coincide with each other with respect to the depth direction.

Figure 5:
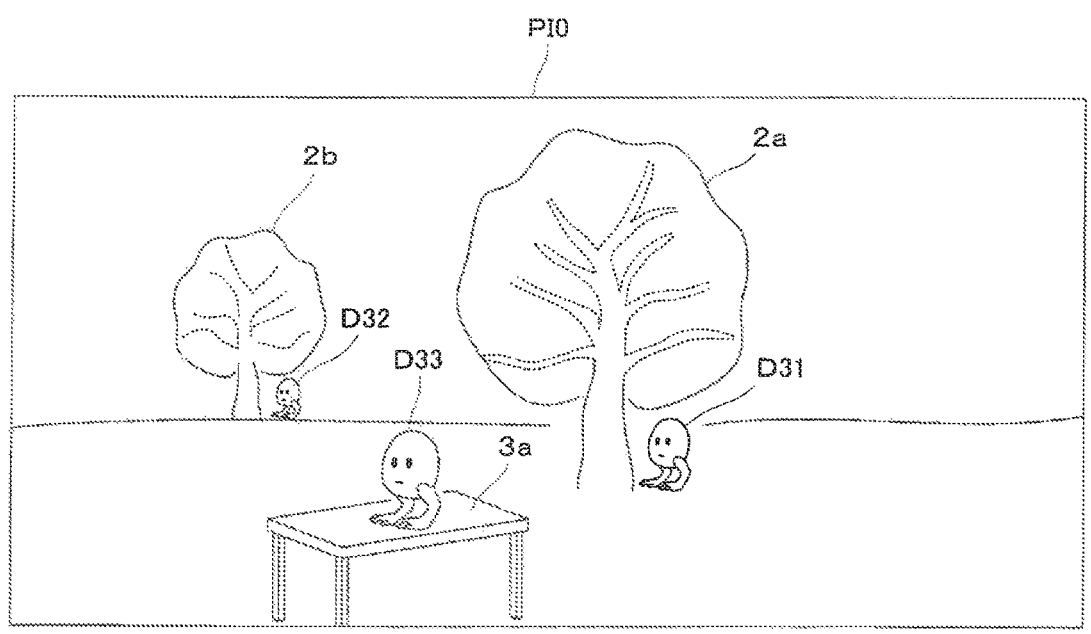
FIG. 5 is a conceptual view for explaining how to superimpose an outside world image and a virtual image on each other.

FIG. 5 is a diagram for explaining a specific operation example of the image display device 100. An outside world image PI0 in the outside-world field of view is, for example, outdoor scenery, in which, for example, trees 2a and 2b and a desk 3a are present. A display image as a virtual image displayed by the image display device 100 includes image elements D31 to D33 like characters. When the lines of sight meet on any of the trees 2a and 2b and the desk 3a, the display image can be displayed at the position. Here, for the display of the image element D31, the convergence and the focus position (focal point) are set in consideration of a distance to the tree 2a. For the display of the image element D33, the convergence and the focus position (focal point) are set in consideration of a distance to the desk 3a. Although the sizes of the image elements D31 to D33 are changed in response to the object distances in the illustrated example, the sizes of the image elements D31 to D33 may be kept constant.

Hereinafter, an example of display operation performed by the image display device 100 shown in FIG. 1 and the like will be described with reference to the flow sheet in FIG. 6.

When the image display device 100 performs line-of-sight reflection display in an AR display mode, the main control section (display control section) 90 starts tracking or following the lines of sight of the user wearing the image display device 100 using the line-of-sight detecting sections 72 and 73 (Step S11). On this occasion, the main control section 90 measures a distance to an object located ahead in the lines of sight of the user with the distance measuring section 71. The main control section 90 determines whether extraction of the object of interest has been performed in parallel with the tracking of the lines of sight of the user (Step S12). Here, the "extraction of the object of interest" means an action of the user to set or fix the lines of sight to the object of interest, and an instruction or an input is performed by, for example, a blinking pattern performed while gazing at the object, or a hand or arm motion pattern. The blinking pattern can be determined from, for example, an image obtained by the camera 76 of the line-of-sight detecting sections 72 and 73. The hand or arm motion pattern can be determined, when the distance measuring section 71 includes a camera, from an image obtained by the camera. When the extraction of the object of interest has been performed, the main control section 90 causes the image display sections 100A and 100B to additionally display the image element at the position corresponding to the object specified by the lines of sight of the user. Specifically, in the example shown in FIG. 5, when the user performs an extraction motion of the object of interest while gazing at the desk 3a, the image element D33 like a character is displayed on the desk 3a (Step S13). Here, the convergence and the focus position (focal point) of the image element D33 like a character are close to the convergence and the focus position (focal point) when the user views the desk 3a. The main control section 90 determines whether cancellation of the object of interest has been performed (Step S14). Here, the "cancellation of the object of interest" means an action of eliminating the image element added to the object of interest, and an instruction or an input is performed by, for example, a blinking pattern performed while gazing at the object, a hand or arm motion pattern, or manipulation of an input/output manipulating section 95 attached to the main control section 90. When the cancellation of the object of interest has been performed, the main control section 90 causes the image display sections 100A and 100B to eliminate the image element displayed at the position corresponding to the object in Step S13 (Step S15). Thereafter, if the operation does not end (Step S16), the operation is returned to Step S12 and repeated. In the above, the setting and cancellation of the object of interest are performed using the blinking pattern. However, when gazing at an object that the user is interested in continues for a predetermined time or more, the object is set as the object of interest; while when gazing at a specific object other than the object set as the object of interest continues for the predetermined time or more, or when gazing at the object of interest is interrupted for the predetermined time or more, the cancellation of the object of interest can be performed.

In the above, the display positions of the image elements D31 to D33 can be caused to follow the objects 2a, 2b, and 3a by changing the display positions of the image elements in response to a change in the attitude of the image display device 100. Moreover, although the extraction of the object of interest or the cancellation of the object of interest is determined in the above, an operation such as always displaying the image elements D31 to D33 ahead in the lines of sight of the user, without making such determination, is also possible.

Figure 6:
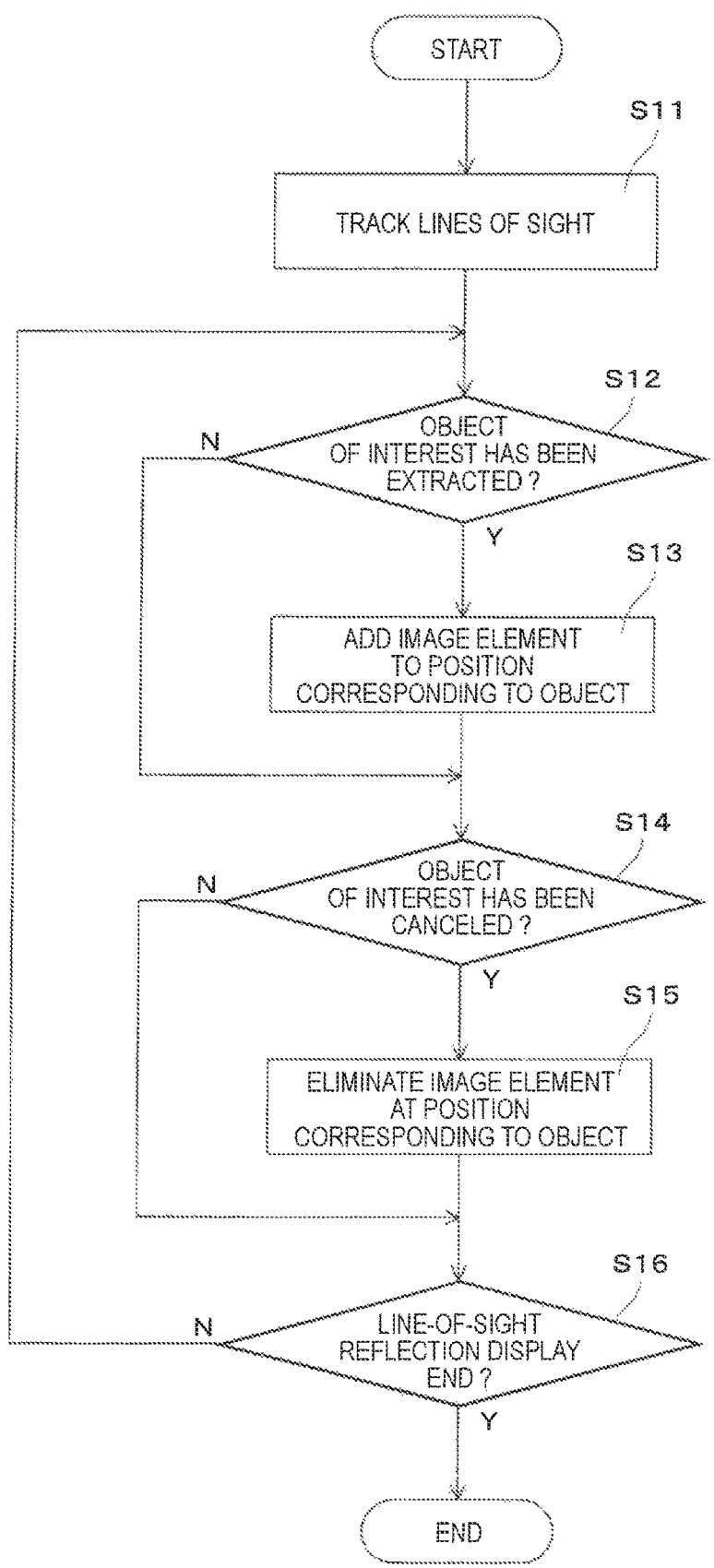
FIG. 6 is a conceptual view for explaining the operation of the image display device.

The operation as shown in FIG. 6 can be incorporated into sightseeing or other guide software, and a description relating to the object of interest of the user can be provided by adding textual information to the image element like a character or adding sounds. The operation as shown in FIG. 6 is not limited to the sightseeing or other guide software, but can be applied to nature observation or other educational software, remote instruction-providing software for handicraft or other work, arrangement confirmation software for virtually installing furniture or other goods, software for presenting conference presentation materials, various game software, and the like.

In the above operation description, it is assumed that the distance measuring section 71 or the line-of-sight detecting section 72 detects the distance or the line of sight for all of objects at which the line of sight gazes in the outside-world field of view or in the display area of the virtual image as illustrated in FIG. 5. However, it is also possible to perform control such that the distance or the line of sight is detected only for an object present in, for example, the central area in the display area of the virtual image.

In the image display device 100 according to the embodiment as described above, the main control section (display control section) 90 controls the focal point and convergence changing section 60 based on the line-of-sight direction and the distance to the object detected by the line-of-sight direction and distance detecting sections 71, 72, and 73. Therefore, an image at substantially the same convergence and in substantially the same focus state as those of an object in the outside world visually recognized by the viewer can be displayed for the object, and thus a feeling of strangeness or fatigue can be reduced.

Second Embodiment

Hereinafter, an image display device according to a second embodiment will be described. The embodiment is a modified example of the image display device of the first embodiment, and portions overlapping those of the first embodiment will not be described.

Figure 7:
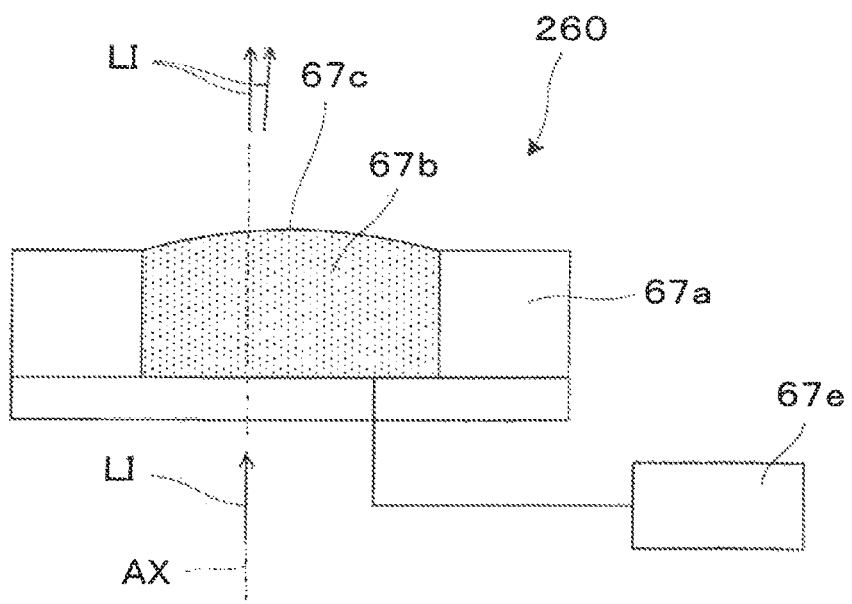
FIG. 7 is a diagram for explaining an image display device of a second embodiment.

As shown in FIG. 7, a focal point and convergence changing section 260 incorporated into the image display device of the second embodiment includes a container 67a whose optical path portion has a light transmitting property, water or other liquid 67b, and a sealing film 67c having a light transmitting property. The focal point and convergence changing section 260 changes its lens shape based on the amount of the liquid 67b contained in the container 67a. That is, in the focal point and convergence changing section 260, the amount of liquid in the container 67a can be increased or reduced by an actuator 67e, so that the sealing film 67c is deformed in a concave or convex manner to exert the effect of light condensation or the like on the video light LI passing through the liquid. When the axis of symmetry of the container 67a is previously shifted with respect to the optical axis AX of the image forming section 105a or 105b, a deflection that changes the emitting direction of the video light LI is possible in addition to exerting the effect of light condensation or the like on the video light LI. The focal point and convergence changing section 260 operates, similarly to the focal point and convergence changing section 60 of the first embodiment, so as to satisfy the conjunction relationship as shown in FIG. 3, and thus the focus position (focal point) and the angle of convergence can be approximately matched for any object.

Third Embodiment

Hereinafter, an image display device according to a third embodiment will be described. The embodiment is a modified example of the image display device of the first embodiment, and portions overlapping those of the first embodiment will not be described.

Figure 8:
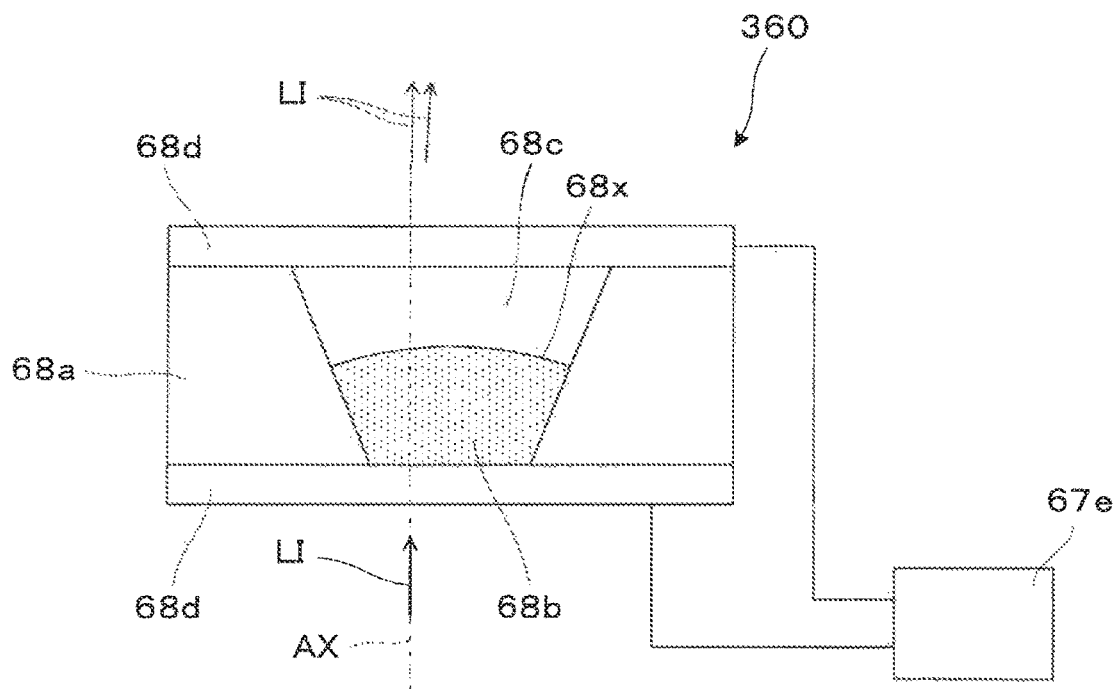
FIG. 8 is a diagram for explaining an image display device of a third embodiment.

As shown in FIG. 8, a focal point and convergence changing section 360 incorporated into the image display device of the third embodiment is a liquid lens, and includes a container 68a whose optical path portion has a light transmitting property, a first liquid 68b, a second liquid 68c, and a pair of electrodes 68d having a light transmitting property. Here, the first liquid 68b and the second liquid 68c are two kinds of liquids having different specific gravities, and are each composed of, for example, water, oil, or other material. In the focal point and convergence changing section 360, an electric field is formed by an actuator 68e through the electrodes 68d for the two kinds of liquids 68b and 68c having different specific gravities in the container 68a, so that a boundary 68x between the liquids 68b and 68c is deformed in a concave or convex manner to exert the effect of light condensation or the like on the video light LI passing through the liquids. When the axis of symmetry of the container 68a is previously shifted with respect to the optical axis AX of the image forming section 105a or 105b, a deflection that changes the emitting direction of the video light LI is possible in addition to exerting the effect of light condensation or the like on the video light LI. The focal point and convergence changing section 360 operates, similarly to the focal point and convergence changing section 60 of the first embodiment, so as to satisfy the conjunction relationship as shown in FIG. 3, and thus the focus position (focal point) and the angle of convergence can be approximately matched for any object.

OTHERS

Although the invention has been described above based on the embodiments, the invention is not limited to the embodiments but can be implemented in various aspects within the scope not departing from the gist thereof.

For example, in the embodiments, the convergence and the focal point of the display image to be projected are changed in conjunction with each other in a predetermined relationship by the optical member 61 provided in the focal point and convergence changing section 60. However, the convergence and the focal point can be adjusted independently of each other. For example, the image forming device 40 is moved in the horizontal direction vertical to the optical axis AX while making the axis of symmetry of the liquid lens as shown in FIG. 8 coincident with the optical axis AX of the image forming section 105a or 105b to change the power of the liquid lens, or an image displayed in the image forming device 40 is shifted, so that the focus position (focal point) and the angle of convergence can be controlled independently of each other.

Moreover, in the embodiments, a combination of the distance measuring section 71 and the line-of-sight detecting sections 72 and 73 is used as the line-of-sight direction and distance detecting section. However, it is also possible to use a sensor that collectively performs distance measurement and line-of-sight detection. For example, the line-of-sight direction can be determined as the average value of outputs of the line-of-sight detecting sections 72 and 73, and the angle of convergence can be obtained as a difference in the outputs of the line-of-sight detecting sections 72 and 73. The focus position can be calculated backwards from the angle of convergence obtained as described above.

The predetermined field of view EA where a distance to an object is detected is not limited to the effective field of view or the like. Any of a range that can be assumed as a point of regard (POR), a range where a text can be identified, a range where an eye movement can be easily performed, a range where a shape can be identified, a range where color information can be identified, the limit of the field of view, and the like can be employed, and also, these can be switched depending on the situation. The range that can be assumed as a point of regard (POR) can be set to an angular range of approximately 1 degree; the range where a text can be identified can be set to an angular range of approximately 10 degrees; the range where an eye movement can be easily performed can be set to an angular range of approximately 15 degrees; the range where a shape can be identified can be set to an angular range of approximately 30 degrees; the range where color information can be identified can be set to an angular range of approximately 60 degrees; and the limit of the field of view can be set to an angular range of approximately 94 degrees.

In the above description, the image display combining section 101a or 101b uses a light guide body. However, it is possible to use one including a projection system composed of a mirror, a lens, or a half-mirror as the image display combining section 101a or 101b.

Moreover, in the case of using a light guide system using a light guide device 30, or a projection system composed of a mirror or a lens as described above, video light can be extracted to the eye side using, for example, a reflecting unit including a plurality of half-mirrors disclosed in JP-A-2017-3845.

In the above description, the light guide device 30, which forms a virtual image on a refracting surface or a reflecting surface, is used as the image display combining section 101a or 101b. However, the image display combining section 101a or 101b is not limited to this, and it is possible to use one that uses a diffraction surface to form a virtual image or uses a hologram element to form a virtual image as the image display combining section 101a or 101b.

In the above description, a specific description has been made in which the image display device 100 of the embodiment is a head-mounted display. However, the image display device 100 of the embodiment can be applied also to a head-up display, a binocular-type hand-held display, and the like.

The entire disclosure of Japanese Patent Application No. 2017-064542, filed Mar. 29, 2017 is expressly incorporated by reference herein.

What is claimed is:

1. An image display device comprising:
an image display section that displays an image for a user and allows the user to visually recognize external light; and
a line-of-sight direction and distance detecting section that detects a line-of-sight direction of the user and a distance to an object located in the line-of-sight direction, wherein:
the image display section changes a convergence and a focal point of a display image to be projected by using a movable optical member, and
the focal point and the convergence of the display image to be projected are changed based on the line-of-sight direction and the distance to the object detected by the line-of-sight direction and distance detecting section.

2. The image display device according to claim 1, wherein the convergence and the focal point of the display image to be projected are adjusted based on an angle of convergence obtained from the line-of-sight direction and the distance to the object detected by the line-of-sight direction and distance detecting section.

3. The image display device according to claim 2, wherein the movable optical member changes the convergence and the focal point, in conjunction with each other, of the display image to be projected, in a predetermined relationship.

4. The image display device according to claim 3, wherein the movable optical member is asymmetrically disposed with respect to a projection optical axis of a projection optical system for displaying an image for the user, is driven so as to change a power of the movable optical member, and changes the convergence and the focal point of the display image to be projected with a change in the power.

5. The image display device according to claim 4, wherein:
the movable optical member includes a pair of lenses,
the pair of lenses each include a concave portion and a convex portion; and
the movable optical member adjusts the focal point and the convergence by moving at least one of the pair of lenses in a horizontal direction intersecting an optical axis.

6. The image display device according to claim 4, wherein the movable optical member changes its lens shape based on an amount of a liquid contained therein.

7. The image display device according to claim 4, wherein the movable optical member deforms a boundary between two kinds of liquids having different specific gravities with an electric field applied to the liquids.

8. The image display device according to claim 1, wherein the line-of-sight direction and distance detecting section detects a distance to an object within a range of a predetermined field of view with respect to the detected line-of-sight direction.

* * * * *